(No Model.)

F. W. KELLY.
ANTI SIPHONING TRAP.

No. 304,736. Patented Sept. 9, 1884.

WITNESSES.
Louis Fesser Jr.
Daniel Murphy

Francis William Kelly,
INVENTOR, BY
Louis Fesser & Co.
Atty's.

UNITED STATES PATENT OFFICE.

FRANCIS WILLIAM KELLY, OF MINNEAPOLIS, MINNESOTA.

ANTI-SIPHONING TRAP.

SPECIFICATION forming part of Letters Patent No. 304,736, dated September 9, 1884.

Application filed July 11, 1883. (No model.)

*To all whom it may concern:*

Be it known that I, FRANCIS WILLIAM KELLY, a citizen of the United States, and a resident of Minneapolis, in the county of Hennepin, in the State of Minnesota, have invented certain new and useful Improvements in Automatic Anti-Siphoning Traps, of which the following specification is a full, clear, and exact description, reference being also had to the accompanying drawings, in which—

Figure 1:
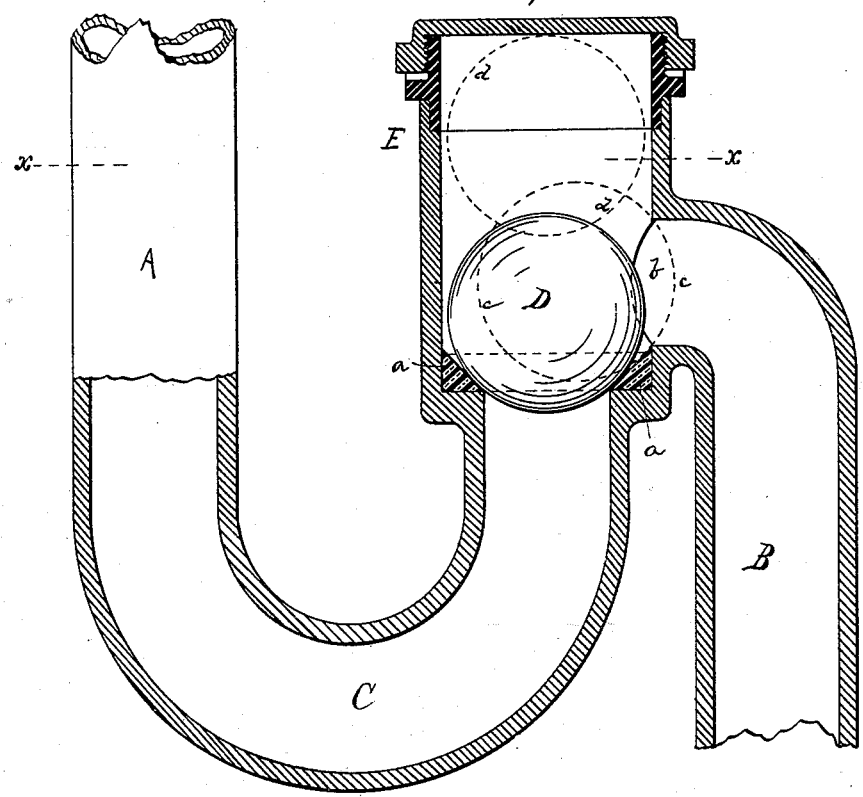
Figure 2:
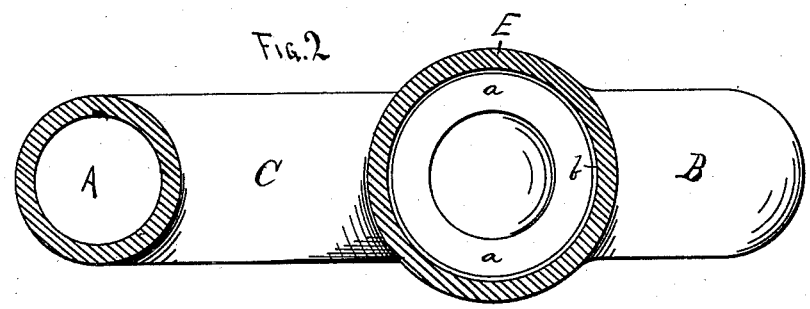

Figure 1 is a sectional side view, and Fig. 2 is a plan view on the line $x$ $x$ of Fig. 1.

A represents the discharge or "overflow" pipe leading from a wash-bowl, bath-tub, sink, or other place, and B represents the pipe leading to the sewer, cesspool, or other place into which the water, &c., is to be conveyed. The pipe A is bent up into the form of a water-trap, C, and provided upon top of the trap with a valve-seat, $a$, upon which a rubber or other suitable globular valve, D, is seated. The pipe above the valve-seat is enlarged into a chamber, E, provided with a cap, F, through which the valve and seat will be set in position or renewed or repaired when necessary. The pipe B is connected to the lower part of the enlarged chamber E, the entrance $b$ to the pipe B forming a seat to the valve D, so that the latter can roll over and seat itself upon the edges of the opening $b$, as indicated by dotted lines $c$. The space above the valve in the chamber E is large enough to permit the valve D to rise upward above the opening $b$, as indicated by dotted lines $d$. By this arrangement, when the water is flowing through the pipe A and trap C, it will raise the valve D up from its seat into the chamber E, and escape beneath it into the pipe B, and the valve drop down again upon its seat $a$, when the flow ceases, and thus check any backflow. Should a vacuum be formed in the pipe B, the suction would at once draw the valve D over and seat it upon the seat $b$, and at once check the vacuum and prevent the suction from drawing the water out of the trap C, and permitting foul air or sewer-gas to escape through the pipe A.

Having described my invention and set forth its merits, what I claim is—

The combination of the trap-pipe C, having the horizontal valve-seat $a$, the valve-chamber E over the said valve-seat, the overflow-pipe B, leading from one side of the valve-chamber, the vertical valve-seat $b$ at the opening into the overflow-pipe, and formed to seat a ball-valve, and the ball-valve D, substantially as herein specified, whereby the valve is made to serve the several purposes of closing the trap-pipe against backward flow, of closing the overflow-pipe against siphoning the trap, and of rising into the chamber above both valve-seats to allow a free discharge of liquid through the trap.

In testimony whereof I have hereunto set my hand in presence of two subscribing witnesses.

FRANCIS WILLIAM KELLY.

Witnesses:
C. N. WOODWARD,
LOUIS FEESER, Sr.